Dec. 11, 1934.  G. W. ENGSTROM ET AL  1,983,539
STEAM PROPELLED RAILWAY VEHICLE
Filed July 7, 1930    10 Sheets-Sheet 8
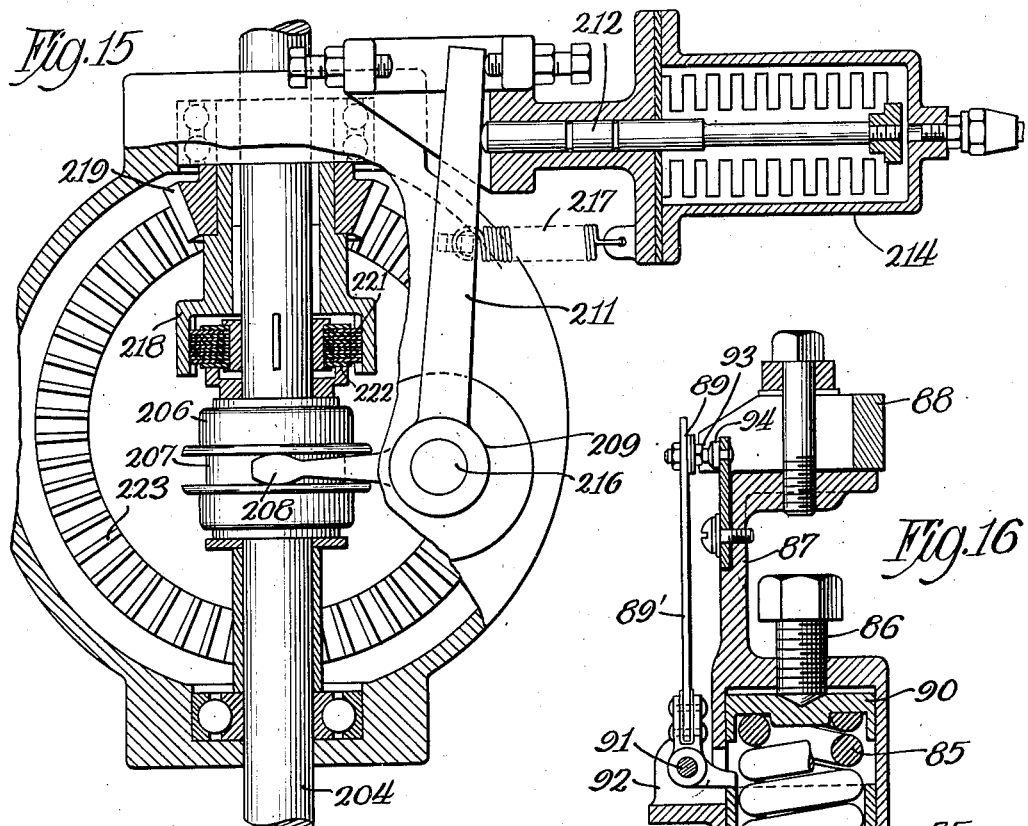
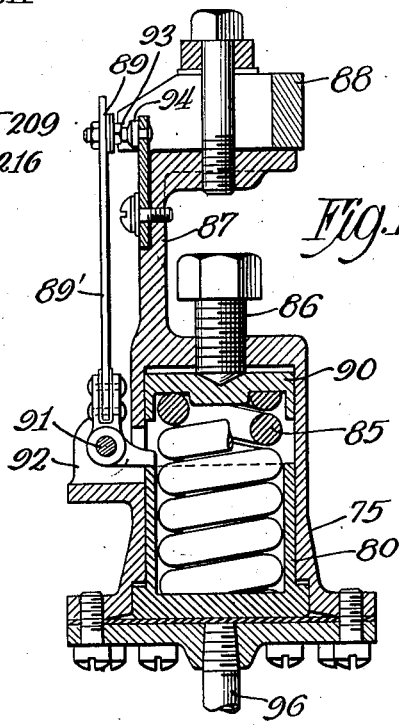
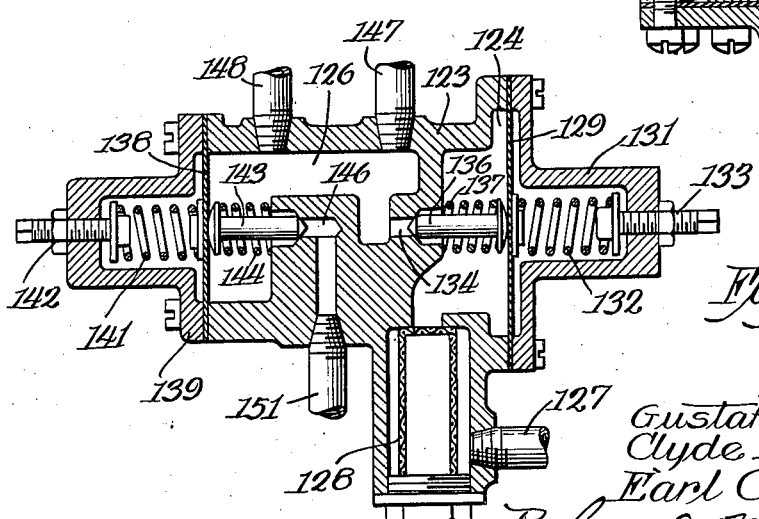
Inventors:
Gustaf W. Engstrom
Clyde B. Faverty
Earl C. Walker
By George E. Mueller  Atty.

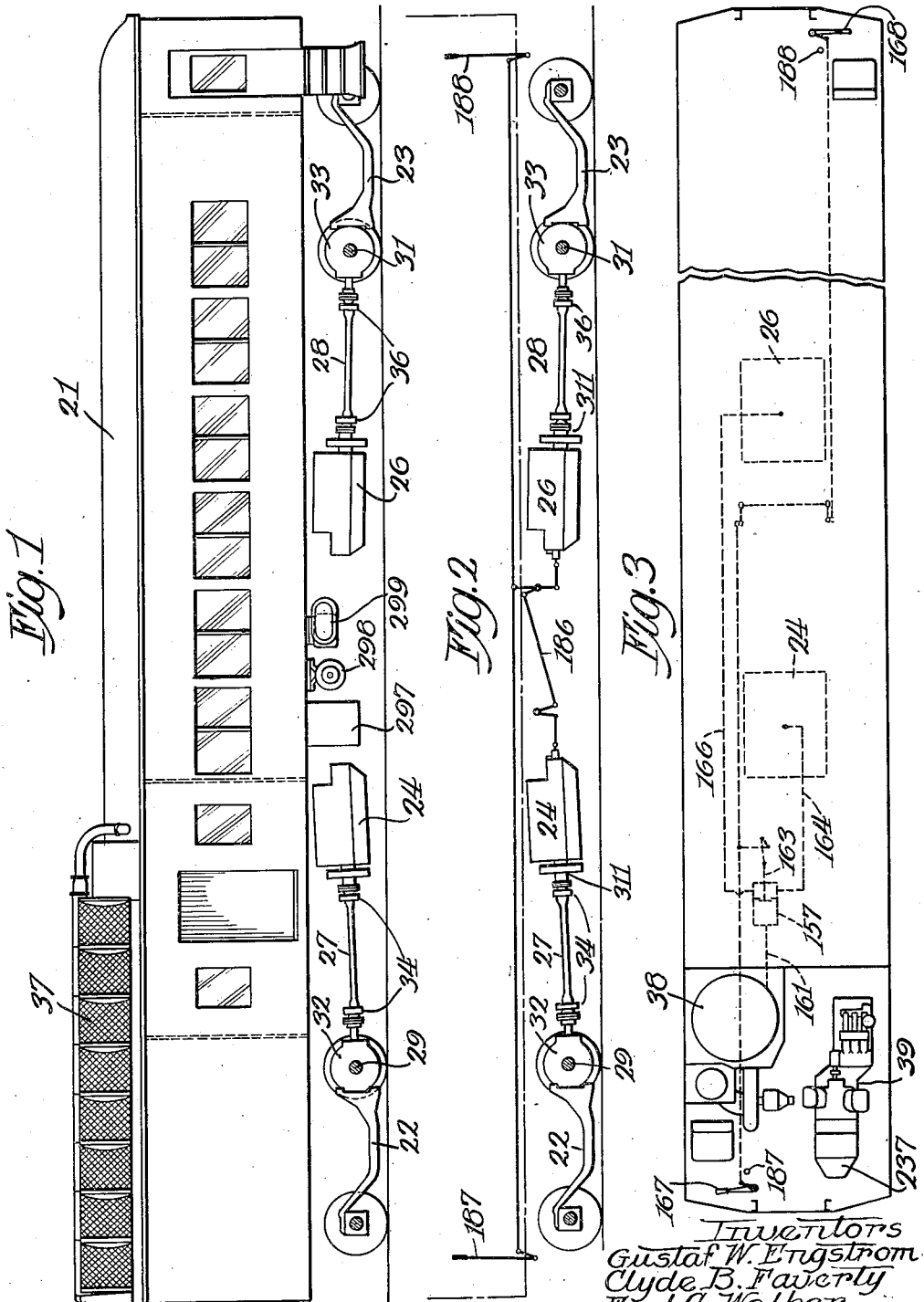

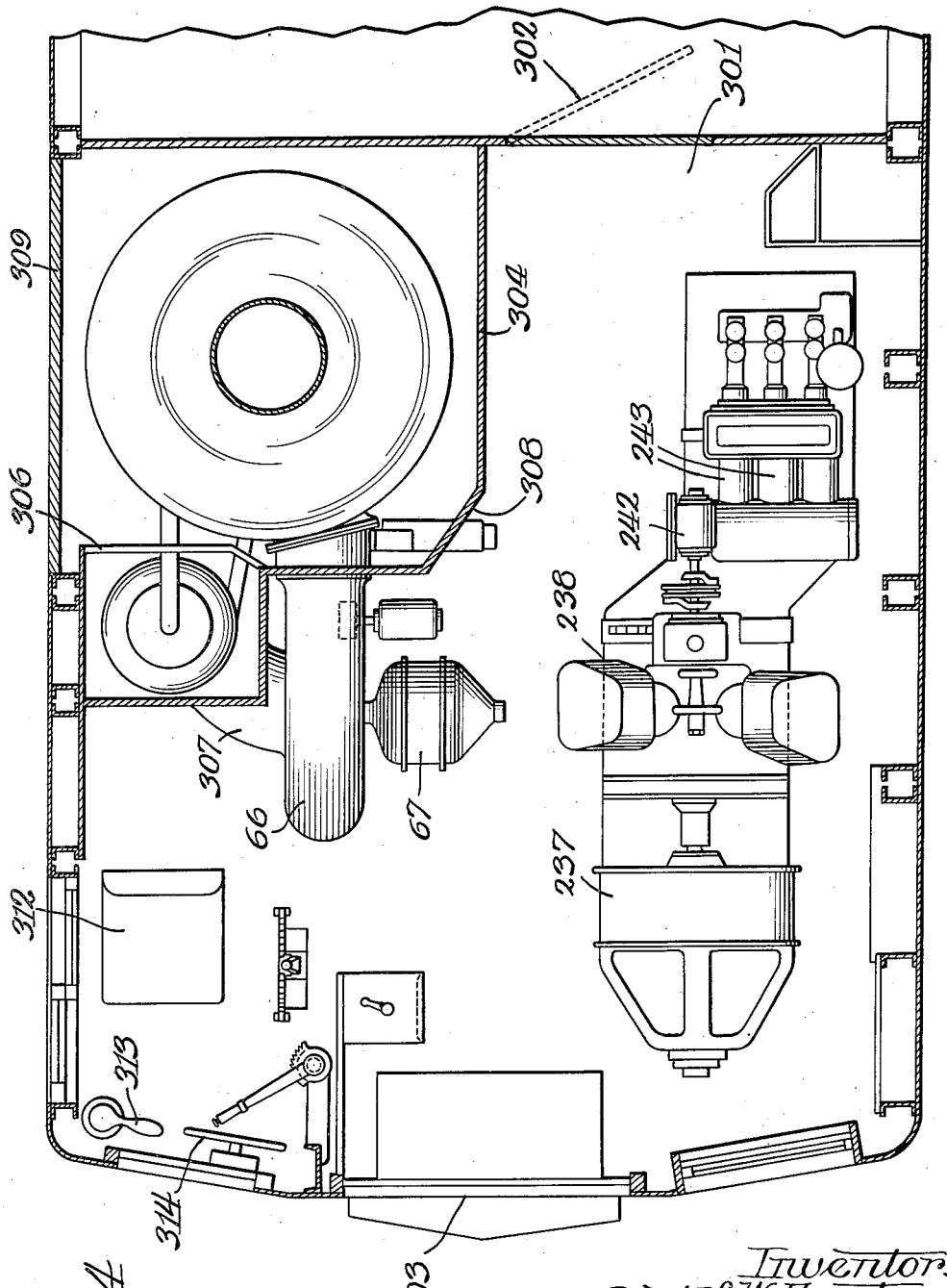

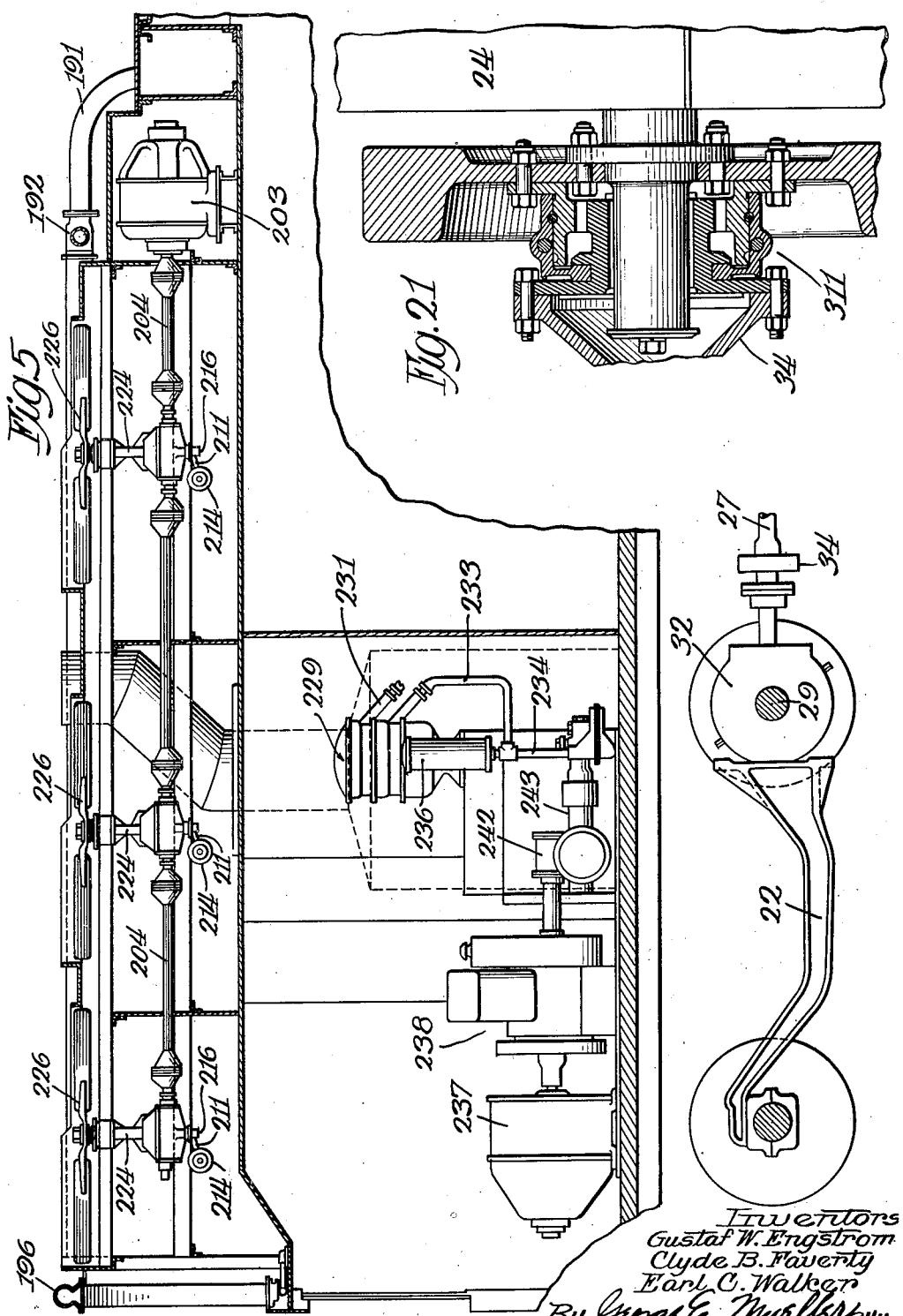

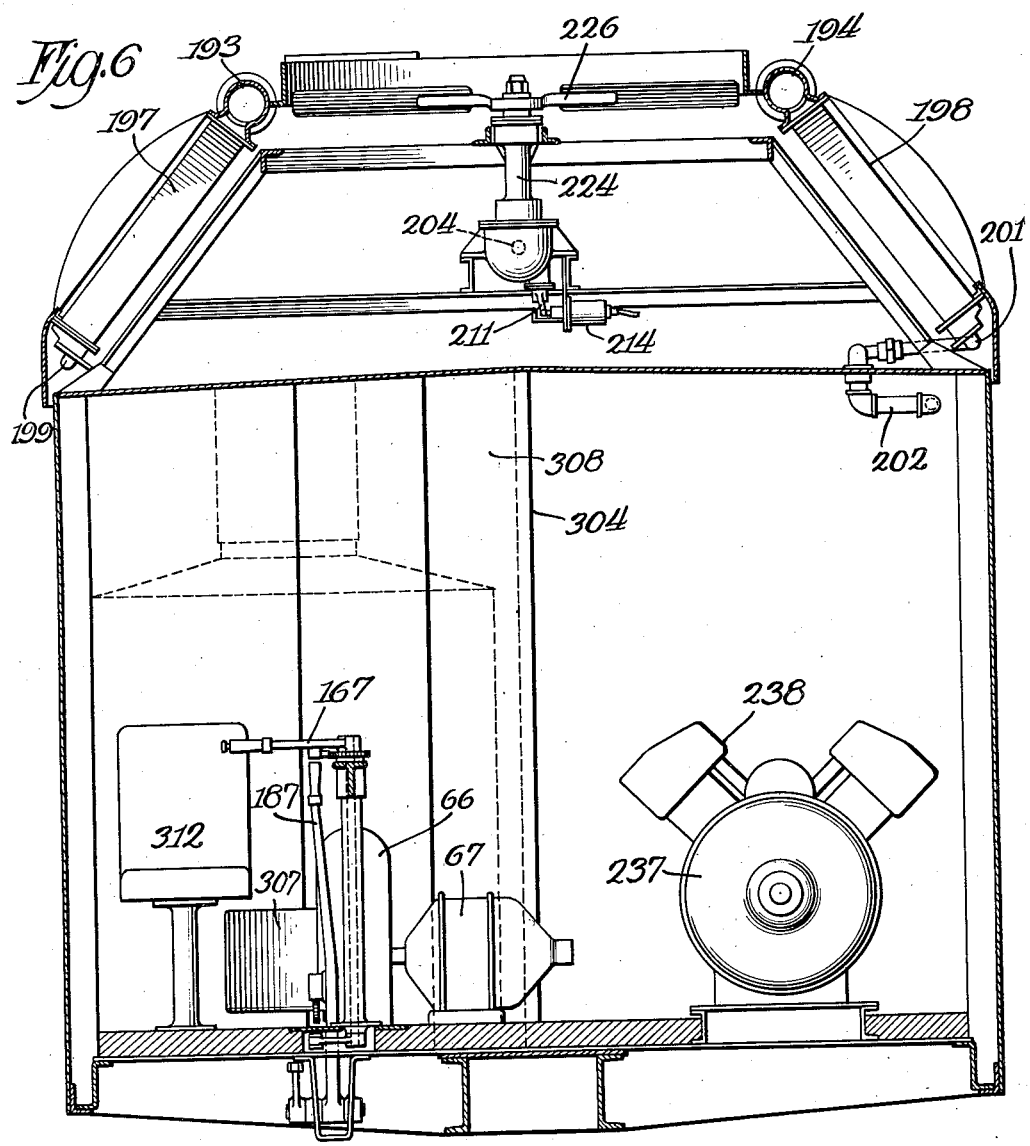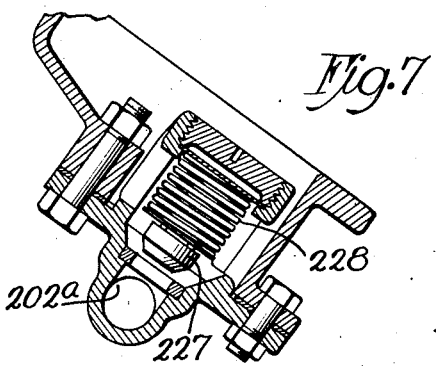

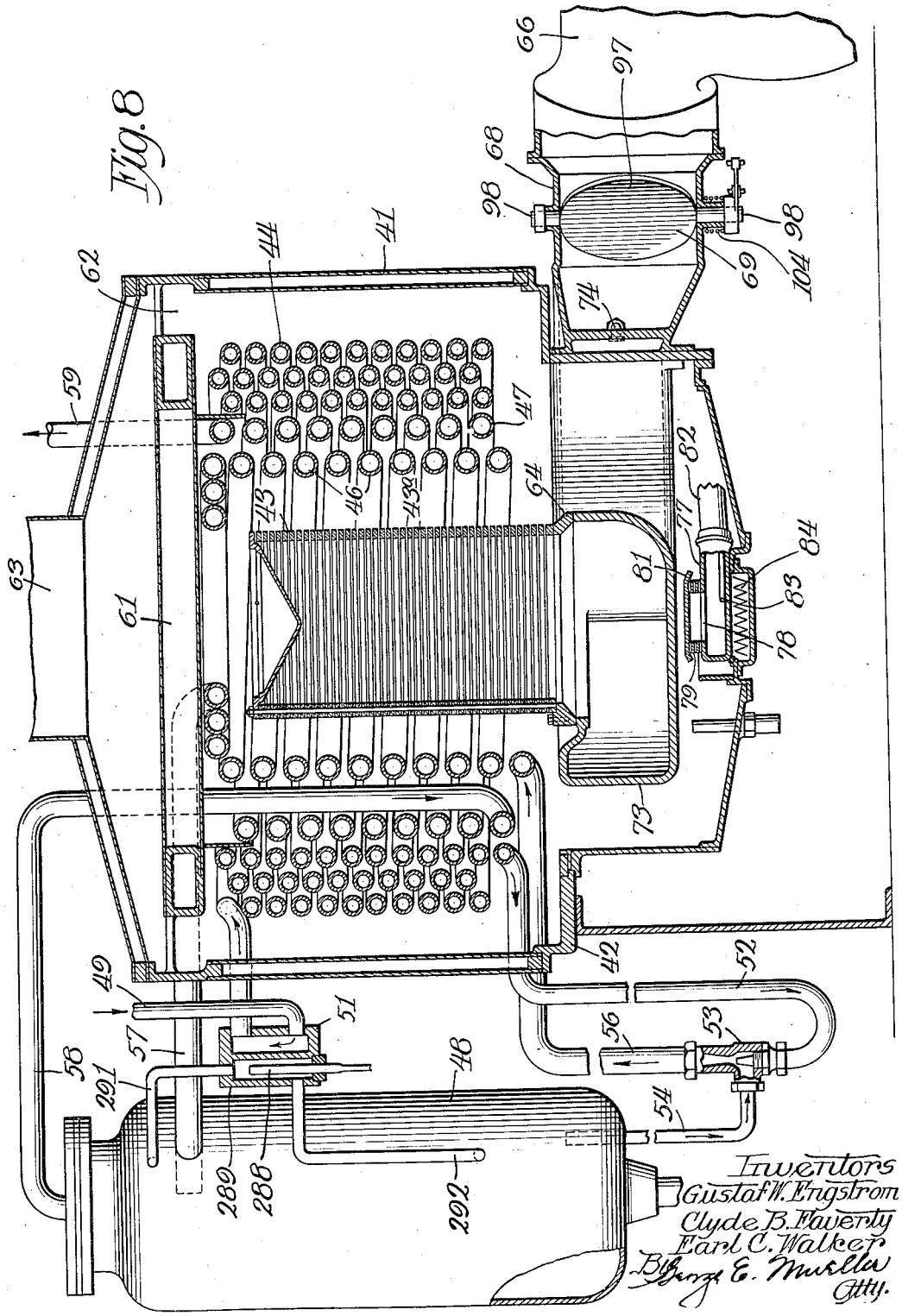

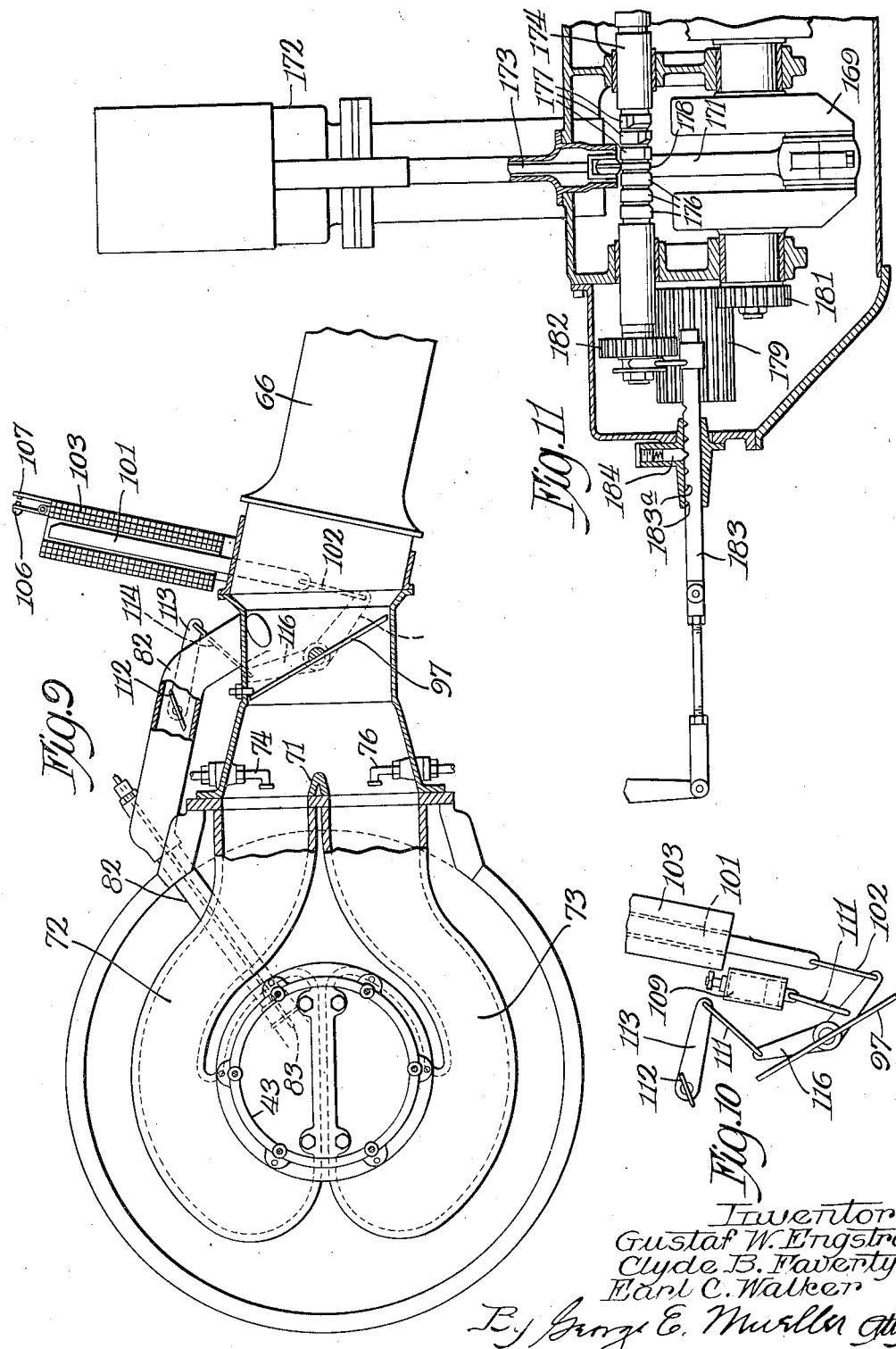

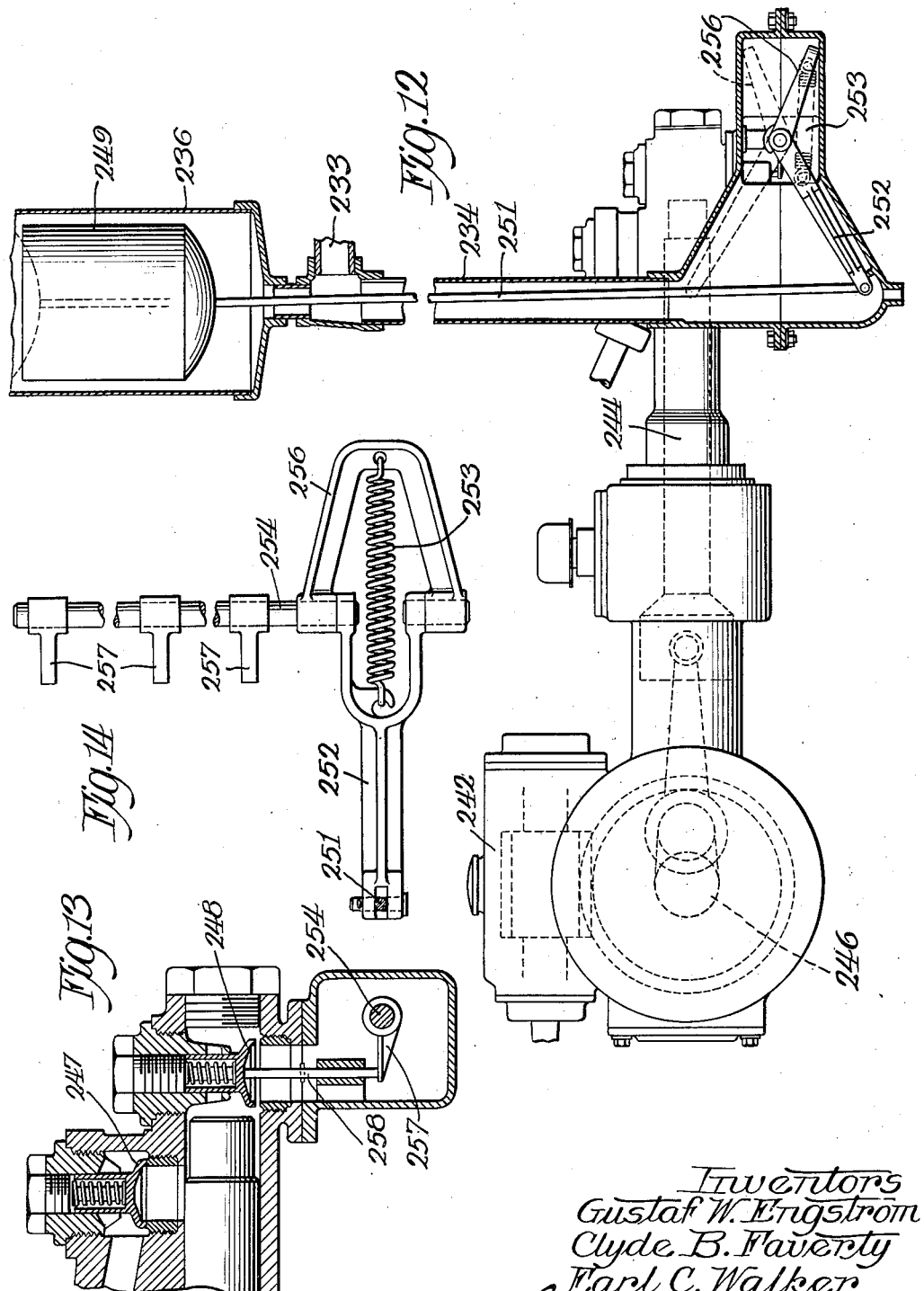

Dec. 11, 1934.   G. W. ENGSTROM ET AL   1,983,539
STEAM PROPELLED RAILWAY VEHICLE
Filed July 7, 1930   10 Sheets-Sheet 9
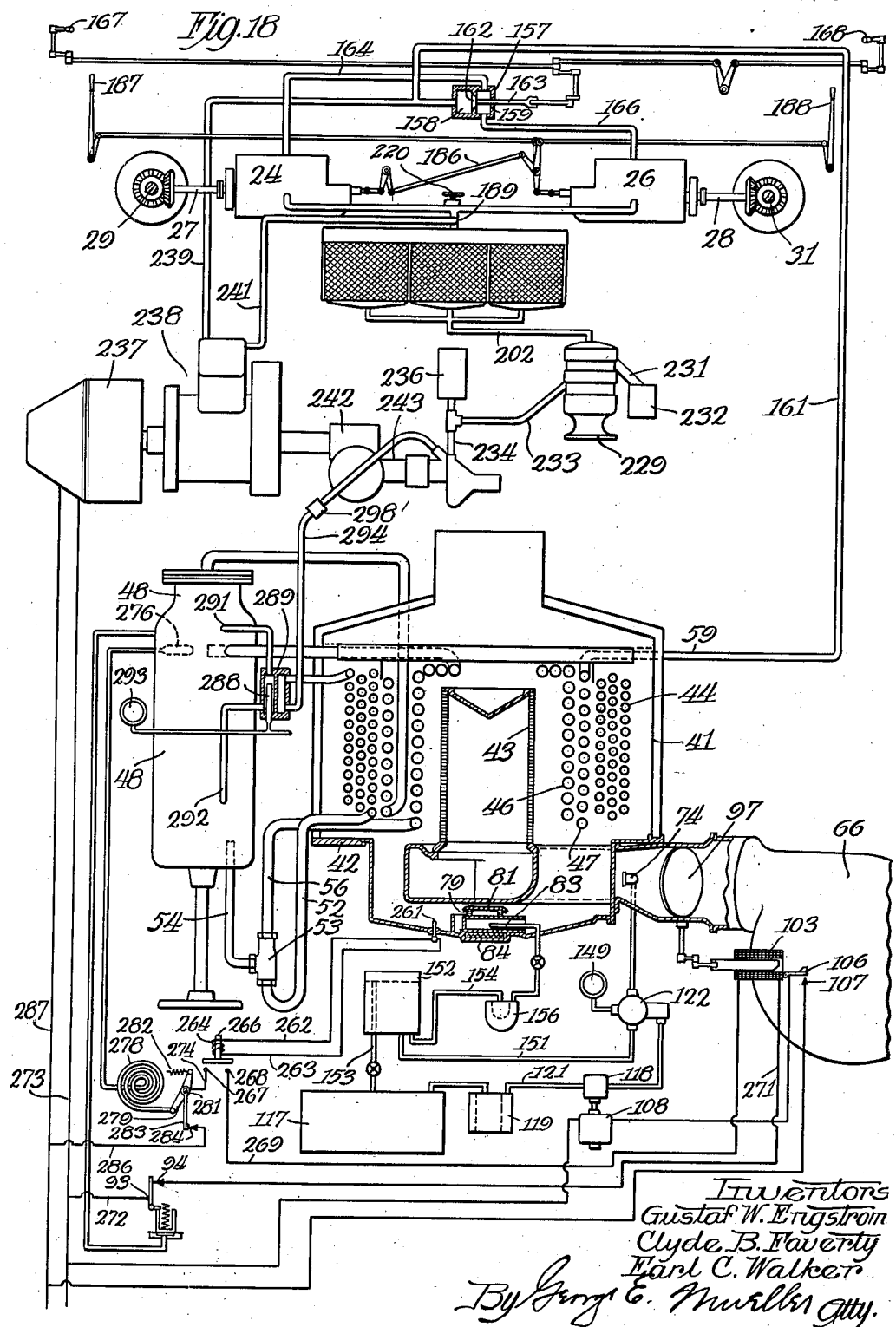
Inventors
Gustaf W. Engstrom
Clyde B. Faverty
Earl C. Walker
By George E. Mueller Atty.

Dec. 11, 1934.   G. W. ENGSTROM ET AL   1,983,539
STEAM PROPELLED RAILWAY VEHICLE
Filed July 7, 1930    10 Sheets-Sheet 10
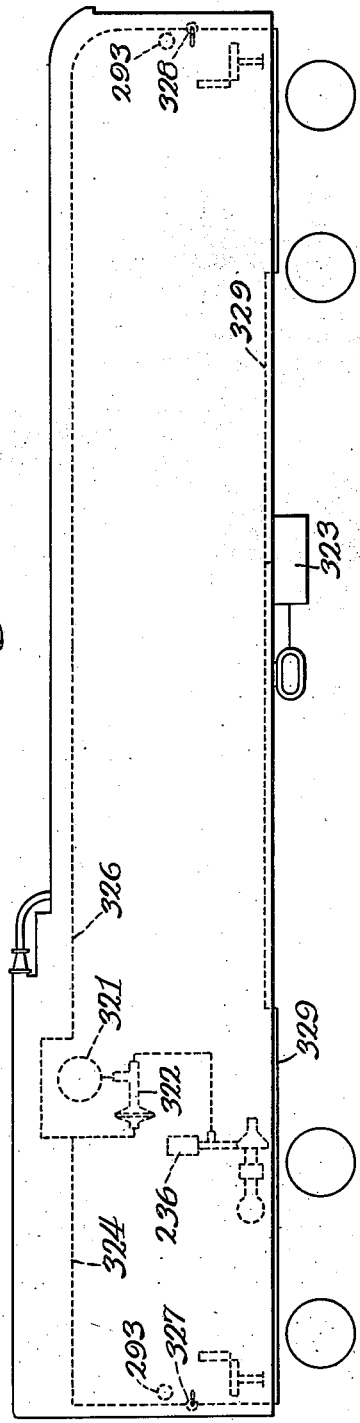
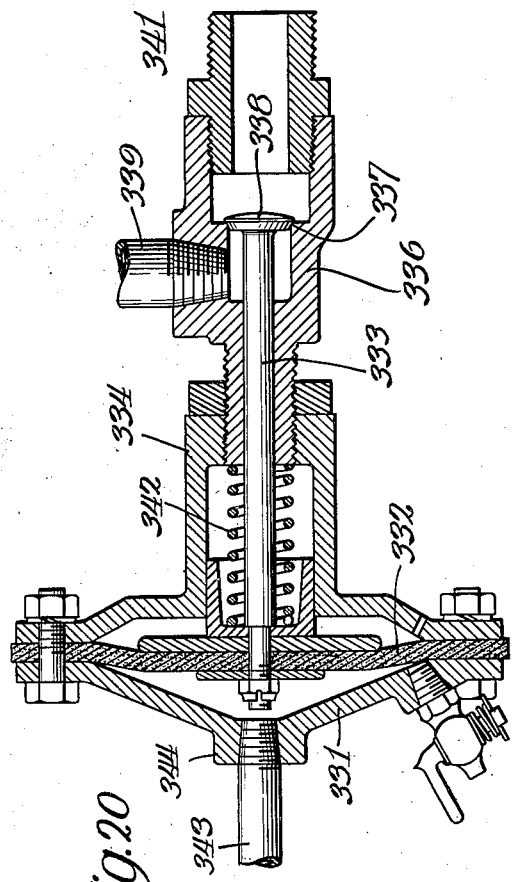
Inventors
Gustaf W. Engstrom
Clyde B. Faverty
Earl C. Walker
By George E. Mueller   Atty.

Patented Dec. 11, 1934 1,983,539

UNITED STATES PATENT OFFICE 1,983,539

STEAM PROPELLED RAILWAY VEHICLE

Gustaf W. Engstrom, Riverside, Ill., Clyde B. Faverty, Hammond, Ind., and Earl C. Walker, Chicago, Ill., assignors to International Harvester Company, a corporation of New Jersey Application July 7, 1930, Serial No. 466,084

27 Claims. (Cl. 105—37)

Our invention relates in general to steam propelled railway vehicles, and to a particular type of steam propelled railway coach to which has been given the name "locomotor."

The great railway systems of this country were built up at a time and under circumstances wherein the only acceptable or sufficiently developed form of power was the ordinary steam locomotive. Moreover, no other type of power has ever been developed which is the equal of the steam locomotive throughout the broad requirements of railroad transportation service. In comparatively isolated instances other forms of power have been used, but in each case, some outstanding advantage of the steam locomotive has been sacrificed. This sacrifice has, of course, been accepted because the new type of power seemed better to fit the controlling conditions in a particular case.

The urgent need for a different type of power in particular cases is determined by the particular conditions encountered. In large cities, ordinary steam power is objected to by the public generally on account of the smoke, noise, gas, etc., coincident with ordinary steam operation. This objection has led to electrification of terminal equipment by many large roads, and while this solves the problem to some extent, it entails the expenditure of large sums of money for road equipment, makes necessary changed systems of operation, the training of new personnel, and introduces many other factors which could very desirably be eliminated. The use of steam locomotives on comparatively short runs with relatively long lay-overs is objected to by railway management as it entails expense of operation not commensurate with the financial returns. There are very many short lines, feeder lines, and the like, forming the part of every large railway system which are yearly operated at a loss, but which lines must be maintained for various purposes. Electrification of such short lines would effect some saving in lay-over costs, but the added cost of plant and equipment would so offset the saving, that electrification under these circumstances is entirely undesirable. To meet this situation, other forms of power have been substituted with some fair success, but still leaving very much to be desired from the standpoint of operation, maintaining schedules, and the like. Various forms of gas-electric combinations, steam-electric combinations and the like have been applied to these problems; but, in each case, emergency reserve power and economical direct drive have been sacrificed, and vibration invited when changing to internal combustion power, but this has been considered justifiable as stated, where light traffic and long lay-overs have made crew payroll and stand-by coal consumption the crew payroll and stand-by coal consumption the most fertile fields for economy. In the conception of our invention we have endeavored to supply an ideal power unit for any particular class of railroad service, one which will assure the special economy or convenience demanded and will at the same time have the very desirable features of the steam locomotive.

Accordingly, the principal object of our invention is the provision of an improved type of railway draft vehicle.

Another object is the provision of a steam propelled unit having all of the advantages of special types of power equipment, but preserving the distinct advantages of steam power and operation.

Another object is the provision of steam power for railway service designed to be constructed as a part of a standard railway coach.

Another object is the provision of an improved type of railway car adapted for operation as a single unit, but having sufficient reserve power for drawing a number of trailers.

Another object is the provision of a steam propelled railway car which can be operated with full satisfaction by a single workman under all conditions.

Another object is the provision of a steam propelled car which can be operated with unusual economy while in service, but designed to consume a minimum amount of "stand-by" fuel.

Another object is the provision of a steam propelled car which can be allowed to become entirely "cold" during a lay-over, but capable of generating adequate operating power within a very short time.

Another object is the provision of a self-propelled steam driven car wherein the necessary equipment may be placed to allow substantially full passenger or baggage carrying capacity in a standard type of coach.

Another object is the provision of a steam propelled car having a steam system adaptable for efficient operation during all kinds of weather conditions.

Another object is the provision of a self-propelled railway coach wherein objectionable noises, vibrations and odors which might be objectionable to passengers, are substantially eliminated.

Another object is the provision of a steam propelled railway coach having steam generator equipment carried in the coach body but designed to prevent heat from the generator, interfering objectionably with the comfort of passengers.

Other objects, features, and advantages of the invention will be apparent from a consideration of the following detailed description taken with the accompanying drawings, wherein, Fig. 1 is a side elevational view of our improved vehicle, Fig. 2 is a side elevational view of the lower part of the vehicle with a schematic showing of certain control features, Fig. 3 is a plan view with a schematic showing of the grouping of apparatus therein, Fig. 4 is an enlarged plan sectional view of one end of the vehicle showing the relative position of the apparatus, Fig. 5 is an enlarged vertical sectional view showing one end of the car with condenser and other equipment shown in elevation, Fig. 6 is a vertical transverse sectional view through one end of the car, Fig. 7 is an enlarged detail view of a steam trap designed to prevent the flow of live steam from the condensers back through the generating system, Fig. 8 is an enlarged central sectional view of the steam generator, Fig. 9 is an enlarged plan view of the burner, part of the view being shown in section to show the relation of parts, Fig. 10 shows a detail of the draft control mechanism, Fig. 11 is a fragmentary sectional view through the driving engines showing the means for controlling the steam cut-off, Fig. 12 is a side elevational view partly in section showing the means for controlling the feed water to the pump, Fig. 13 is an enlarged fragmentary sectional view showing the valve mechanism of the pump, Fig. 14 is an enlarged plan view of a feature of the pump, Fig. 15 is a enlarged bottom plan view of a part of the condenser operating mechanism, Fig. 16 is a vertical sectional view of a steam operated switch designed to prevent operation of the generator burner when the steam pressure reaches a predetermined amount, Fig. 17 is an enlarged sectional view of a portion of the fuel supply system, Fig. 18 shows schematically the lay-out of the entire system, including the steam system, fuel system, and the part of the electrical system having a direct connection therewith, Fig. 19 is a somewhat schematic view showing the manner of supplying water to the system from either end of the car, Fig. 20 is a sectional view showing the valve employed for this purpose, and Fig. 21 is a detail showing a manner of connecting the engine to the axle.

In general, the car of our invention is in all substantial respects, the same as a standard railway coach. In other words, it can be employed for passenger carrying solely, for baggage transportation, or a combination of these two. The steam generating equipment is housed in a small area at one end of the car, and is so designed that rather than cause objectionable heat in the vicinity thereof, it functions as a ventilator to maintain a steady movement of air through the car at all times. The steam system is what is termed a closed system, with multi-cylinder uni-flow engines mounted to the bottom of the car and having direct drive connections to the axles, and a condenser on the roof of the car designed for, and capable of condensing exhaust steam and delivering the condensate back to the generator under all weather conditions. The car is adapted to be driven from either end, and the steam system and all parts and auxiliaries connected therewith, function with such precision that one workman is all that is necessary for manning the car. There are a number of automatically operating safety appliances, and this is of unusual value in permitting one man operation.

Now with further reference to the details of the invention, as Fig. 1 shows, a standard type of coach 21, is employed, capable of carrying passengers, baggage or the like, in the usual way. The usual wheel trucks 22 and 23 are connected in the usual way, with the underbody, and adapted for engagement with the usual type of rails. Multi-cylinder uni-flow engines 24 and 26 are suspended from the underbody in any suitable manner, and have their shafts 27 and 28 directly connected to axles 29 and 31 through suitable gearing in housings 32 and 33. A pair of universal joints 34—34 and 36—36 is provided for each drive shaft so that the axles are driven without difficulty independent of the position of the trucks relative to the car and engines carried thereby. Still referring to Fig. 1, a condenser system 37 is provided at the top of the car and is arranged as will be explained hereinafter, to provide satisfactory condensation of exhaust steam independent of weather conditions. In the schematic showing of Fig. 3, the steam generating unit 38 is shown at one end of the car, the engines 24 and 26 being shown in dotted lines. The auxiliary equipment 39 is also indicated in dotted lines, and the full details of this equipment and other equipment will now be described.

While our invention is not limited to the use of any specific type of equipment, we have shown much of the equipment in detail in order to illustrate a fully operable combination. Much of the equipment is old in many of its details, although improvements and changes had to be made to fit the equipment for our particular purposes. The general combination, however, has never heretofore been employed.

In describing the equipment we shall start with the steam generating plant shown in Fig. 8 as the portion of the mechanism about which all other features are more or less connected. This generator or "boiler" is of a semi-flash character and includes a cylindrical casing 41 supported on a suitable under-frame 42. A burner 43 is mounted along the vertical axis of the generator and is designed to burn standard grades of fuel oil with Bunsen burner like intensity. Around the burner are disposed a number of coils, arranged in order to obtain specific necessary results, these coils including pre-heater coils 44—44, evaporator coils 46—46 and super-heater coils 47—47. A drum 48 is positioned adjacent to the casing 41 and forms a part of the generator, this drum being partly filled with water, with a head of steam at the top of the water which is employed to supply the driving engines and auxiliary equipment. Feed water under pressure from a pump which will be hereinafter described, is supplied through a pipe 49 to the pre-heater coils 44, the water in its passage to the pre-heater coils passing through a gauge 51 which will also be fully described hereinafter. From the pre-heater coils the water passes by means of a pipe 52, to an injector 53 where additional hot water is drawn from the drum 48 through a pipe 54, the water passing from the injector through a pipe 56 to the steam generating coils 46 which are closest to the burner and receive the full heat of the burning gases. From the evaporator or generating coils 46, a pipe 57 passes the contents of the coils 46 to the drum 48, such contents being discharged tangentially at the top of the drum so as to assist in the separating of the steam and water. From the extreme top of the drum a steam pipe 58 passes steam to the super-heater coils 47 and a pipe 59 takes the super-heated steam from the coils 47 and delivers it to the throttle valve or other point of use. It will be noticed in the arrangement of these coils that the steam is generated in the coils closest to the burner. These are always supplied with water even though steam may have been generated in the pre-heater coils on account of the drawing of water from the drum by the injector 53 immediately before the delivery to the evaporator coils. These coils being at all times filled with water, prevents the burning of the coils closest to the burner where the flame is hottest. The super-heater coils are next adjacent so as to receive a large amount of super-heat but without being sufficiently close to the intense flame to cause any difficulties with burning. The pre-heater coils are arranged on the outside with the recently charged water in the outermost coils where they pick up whatever heat is left in the burned gases after having come in contact with the other coils. The casing has a baffle 61 at the top thereof with side openings 62, and a central flue 63 so that the burning gases in their passage to the flue must of necessity pass through and in contact with all of the coils.

Now with respect to the burner 43 and the fuel system for supplying a combustible mixture thereto, this may also be of any suitable type, although we have found unusually good results with the particular form shown. The burner proper is in the form of a number of spaced rings 43a, mounted on a casting base 64, the combustible mixture being forced under pressure up within the hollow ring structure and out between the rings in the direction of the coils. Force feeding is employed throughout with pre-heated air forced in past fuel oil jets which also supply the oil under pressure in proper amount.

First, as to the air supply, a blower 66 (Fig. 4) is driven by an electrical motor 67 and forces air through an air passage 68, past a valve 69, and through the hollow casting 64. As Fig. 9 shows, this casting has a peculiar shape with a central baffle 71 formed in the passageway 72 and 73, so that the air, before passing up into the burner proper, circulates around the casting 64, and passes out and upwardly from a direction opposite to that in which it entered. (The advantages of this arrangement will be explained later on.)

For supplying fuel for mixture with the incoming air, a pair of jets 74 and 76 is provided, one at each end of the curving passageways 72 and 73. The fuel is supplied through these jets under pressure and commingles with the warm air and is entirely mixed and vaporized before reaching the burner 43.

Now as to the ignition of the gases, we make use of a pilot light which is operated at all times when the cars are in operation, although the burner proper is designed to be automatically shut off when the pressure reaches a predetermined high point, as will happen of course during stops or at any time when a large volume of steam is not being used. The pilot light includes a relatively small casting 77 with a top opening 78 and having separate rings 79 mounted at the top thereof, with a top baffle 81 secured above the rings. Previously warmed air is supplied to the casting 77 by means of a passageway 82, and a small fuel jet 83 delivers the necessary amount of fuel on the bottom portion of the casting 77 in the path of the incoming air. Beneath the casting 77 is a resistance 84 which is used in starting to raise the temperature sufficiently to entirely vaporize the fuel. The vaporized gases in the pilot light burn as they pass through the rings 79. They are ignited originally by direct application of a torch after the burner has become warm, an opening being provided in the outside casing to permit access to the pilot light. The pilot light burns at all times except when the burner is entirely shut and then allowed to get cold. The flame from the pilot light passing around the outside of the casting 64 and passing the burner 43 in its passage to the flue 63, ignites the main burner at any time that a combustible mixture is present. Besides this function the pilot light, being located underneath the casting 64 and immediately adjacent the passageways 72 and 73, assists in the vaporizing of the fuel for the main burner.

The burner operates at full capacity during the entire time of burning, but is arranged so that when the steam pressure reaches a predetermined amount it is automatically extinguished; and is again ignited immediately when the steam pressure is lowered to a predetermined point. In the operation of the specific unit here set forth and which has been run with very great success, the steam pressure is maintained between five hundred fifty and six hundred pounds, the burner being shut off when six-hundred pounds pressure is reached, and again re-ignited when the pressure drops to five hundred fifty pounds. These figures are given for purposes of illustration only. In accomplishing this result we employ a switch mechanism as shown in Fig. 16. This includes a cylinder 75 with a short stroke piston 80 mounted therein and held toward one end of the cylinder by a spring 85. This spring has a cap 90 engaged by a pressure regulating screw 86, this screw being tightened or loosened to regulate the pressure of the spring 85. The cylinder 75 has an extension 87 to which a permanent magnet 88 is secured by suitable means. This magnet attracts the magnetizable portion of an armature 89 pivoted at 91 and having integral therewith a finger 92, projecting over the top of the piston 80. Contacts 93 and 94 are carried by the armature 89 and extension 87 respectively, each arranged for adjustment as to spacing, in any suitable manner. The armature 89 includes a link 89' of spring material which aids in the required operation of the device. Steam is supplied to the cylinder beneath the piston 80 by a pipe 96, this pipe being in direct connection with the main steam line. In the operation of this device the piston 80 is forced upwardly against the spring 85 and engages the finger 92 so as to turn the armature about its pivot 91. Up to a certain point the portion 89' will bend while still being held at the top by the magnet 88. When the tension built up in the portion 89' however, is sufficient to overcome the pull of the magnet the armature moves out at the top with a snap, thereby disconnecting the points 93 and 94. Conversely, when the steam pressure diminishes, the spring 85 forces the piston downwardly and at its low position the points are again brought into contact. When the armature 89 becomes within the field of the permanent magnets it is drawn over with a snap action, thereby closing the contacts. These contacts form a part of an electrical system for controlling the operation of the burner, which control system will now be described.

Referring to Figs. 8, 9 and 10, a damper 97 is positioned across the air passageway, being rigidly connected to trunnions 98, journaled in the top and bottom walls of the passageway. The bottom trunnion 98 has connected thereto a bell crank 116, one arm of which is connected to a plunger type of armature 101 by a link 102, the plunger form of armature being adapted to be energized by a coil 103. A coil spring 104 functions to turn the damper 97 in a direction to close the passageway, while energization of the magnet coil 103 serves to pull the plunger against the force of the spring to open the valve and allow passage of air therethrough. The contacts 93 and 94 form part of an electrical circuit including the electro-magnet 103. The breaking of the contact between these points 93 and 94 as determined by the action of the pressure regulator (Fig. 16) serves to de-energize the magnet and shut off the air to the burner. This electrical circuit is not shown in detail (see Fig. 18, however) as it is of such a simple character that it should be readily understandable to those skilled in the art.

Fuel is supplied to the jets 74 and 76 under pressure and we provide means for shutting off this supply of fuel as an incident to the closing of the damper 97. This is accomplished by means of a pair of spring pressed contacts 106 and 107 adapted to be opened when the plunger armature 101 is released to close the damper 97. These contacts form part of an electrical circuit including a fuel pump 108 (Fig. 18) so that on opening the contacts 106 and 107 the fuel pump is stopped and the oil pressure cut down so as to prevent spraying of oil from the nozzles 74 and 76.

In the practical operation of the burner it is inadvisable for various reasons to close the damper or open the same too rapidly. To do away with this possibility the bell crank lever 99 is connected to a dash pot 109 by means of a link 111 (Fig. 10), this dash pot being capable of regulation by any usual means known in the art.

After closing off the air supply and fuel supply there are still residual gases, both burnt and unburnt, present, and means are provided whereby an auxiliary supply of air under pressure is fed to the burner to completely scavenge the same. This is done by a stop, which prevents the damper 69 from closing fully. This stop is designed, however, so that it can be retracted to permit the damper to close fully, which is advantageous during the starting period, when the main burner assembly is being warmed up by the pilot light.

In connection with the operation of the air supply for the pilot light, provision is made to compensate for differences in air pressure when the main damper is closed, and variations in back pressure from the main burner. As Fig. 9 shows, the pilot light air passageway 82. connects with the main burner passageway in front of the damper, that is, so that air is continuously supplied to the pilot light, even when the supply to the main burner is cut off. When the main damper is closed there is a greater amount of air available for the passageway 82, due to increased pressure built up behind the damper. However, less air pressure is actually needed by the pilot light when the main burner is extinguished.

To control the air supply to the pilot light a small valve or damper 112 is placed in the passageway 82, and an operating arm 113 is connected integral therewith outside the passageway in any suitable manner. This arm is connected by a link 114 to the arm 116 of the bell crank lever secured to the main damper. With this construction the small damper 112 is moved toward a closed position, and an open position, with the closing, or opening of the main damper. The small damper is set, however, so that it is never entirely closed, and when the main burner air supply is entirely cut off, it still passes sufficient air to maintain the pilot light burner in efficient operation. When the main burner air supply comes on, thus causing a back pressure on the pilot light sufficient to extinguish it if no adequate provision were made, the air pressure to the pilot light is also increased.

Before considering further the steam system, reference is made to the fuel supply system as shown partly schematically in detail in Figs. 17 and 18. As previously stated the fuel is any of the commercial grades of fuel oil, and since these products are non-explosive and not highly inflammable, they may be carried in relatively large quantities so that the cruising range of the car may be made to suit any required conditions. A suitable fuel supply tank 117 is therefore carried preferably on the underbody of the car. The fuel is withdrawn by suction from the tank by means of a pump 118 driven by the electric motor 108, a strainer 119 of suitable type being disposed in the line 121 extending from the supply tank to the pump. From the pump, fuel is forced under pressure to a regulator 122. This regulator is shown substantially in detail in Fig. 17 and will be described so that the further movement of the fuel will be fully understood. The fuel regulator includes an irregularly shaped casting 123 having two chambers 124 and 126, the oil being delivered preliminarily to the chamber 124 through the line 127, and passing through a strainer 128 before delivery to the chamber proper. This chamber houses a diaphragm 129 which is mounted between the end of the casting 123 and an end plate 131. It is normally urged inwardly toward the body of the chamber by a coil spring 132 housed in a hollow boss on the end plate 131, tension regulating mechanism 133 as shown being provided to determine the tension on the diaphragm. Between the chambers 124 and 126 is a passageway 134 closed by a plunger 136, this plunger having an enlarged head against which the diaphragm 129 presses. A coil spring 137 surrounding the plunger maintains such tension as to prevent its being thrown out of position, and aids in keeping it centered with respect to the passageway 134 to maintain a proper seat at all times. A similar mechanism is provided in the chamber 126, including a diaphragm 138, head 139, diaphragm tensioning spring 141, tension regulator 142, plunger 143, and centering spring 144. The plunger 143 closes a passageway 146 when its end engages the seat provided therefor, at the entrance to the passageway.

Connected with the chamber 126 is a pipe line 147 leading to the spray nozzles 74 and 76. A second pipe line 148 is connected to a pressure indicating gauge 149 (Fig. 1). The passageway 146 extends to the outside of the pressure regulator casting and connects with a pipe 151 leading to a pilot light reservoir 152. An overflow pipe 153 from reservoir 152 returns excess fuel from such reservoir back to the main fuel tank 117. A pipe 154 in which a strainer 156 is inserted supplies fuel to the pilot light spray nozzle 83. The operation of the pressure regulator is briefly as follows:

When the fuel pump is started, oil under pressure is delivered through the strainer 128 to the chamber 124. When sufficient pressure has been built up to unseat the plunger 136 the oil flows over under pressure to the chamber 126 where it is immediately available through the pipe 147 for supplying the main spray nozzles. Simultaneously, the pressure gauge 149 will indicate the pressure in the fuel line. Continued supply of oil or fuel in excess of that required by the main burner will unseat the plunger 143 and supply the pilot light tank 152 through the feeder line 151. Any excess supply of fuel to the pilot light tank is, of course, returned by the pipe 153 to the main reservoir.

We shall now consider more fully the manner in which the steam produced by the generator is employed. It will be recalled that the car is driven by multi-cylinder uni-flow engines, the exhaust steam from the engines being delivered to a condenser, and the condensate suitably treated is reduced with suitable precautions back to the circulatory portion of the steam generator. The system is entirely closed, but due to difference in pressure in the different parts of the line, and other features incidental to satisfactory operation, the condensed steam is introduced back to the pressure side of the system with suitable precautions. We shall first consider the engines and the steam supply thereto.

The engines 24 and 26 are suspended beneath the underbody and steam is supplied thereto by means of a throttle valve in all substantial respects operating like the usual locomotive throttle. A separate control mechanism is provided at each end of the car, but only a single throttle valve 157 (Fig. 18) is provided. This valve may be of any standard or suitable type, the one shown more or less schematically having a pair of chambers 158 and 159, steam being supplied at full pressure to the chamber 158 by the main steam line 161. A valve is placed between the two chambers and includes a seat forming a part of the valve structure and a valve proper 162, having a valve guide 163 projecting through the chamber 157. By opening valve 162 a greater or less amount, steam is admitted to the chamber 157 and thence through steam lines 164 and 166 to the engines. Suitable valve mechanism is of course, provided for supplying the steam in proper sequence to the engine cylinders, but this has not been shown in detail as not appearing to be necessary for a complete understanding of the present invention. The valve 163 is operated by a suitable system of levers as shown, and throttle handles 167 and 168 are provided, one adapted for location at each end of the car so that the throttle valve can be operated at either position.

A steam cut-off is provided for the engines, as is usual in steam practice, the substantial effect of which being that higher rate of speeds when the car has acquired considerable momentum, and less driving power being required, less steam is fed to the engine cylinders. A portion of one of the engines is shown in detail in Fig. 11, including the specific cut-off mechanism which we have employed with good results. The engine as shown includes a crank shaft 169 to which piston rods 171 (one is shown in the drawings) are connected, the piston rods being attached in the usual manner to pistons (not shown) adapted for reciprocation within cylinders 172. Valve mechanism (not illustrated in detail) is provided for regulating the supply of steam to the piston, a valve being opened by its stem 173 which is actuated by cam shaft 174. This cam shaft is provided with three sets of cams 176, for forward movement of the car, and a corresponding but reversed set 177 for movement of the car in opposite direction. A neutral set 178 is also provided between the two sets of cams so that in this position the valve remains closed independent of any movement of the engine such as would occur in coasting and the like, in which case the engines are of some value for braking purposes. The cam shaft 174 is adapted for longitudinal movement to engage any selected cam beneath the valve stem 173 for operation of the valve, each cam of course, having a different effect or timing. The cam shaft is driven through a relatively long idler gear 179, driven by a spur gear 181, the cam shaft having a corresponding gear 182 mounted to turn therewith but adapted to be moved longitudinally of the idler gear 179. A thrust rod 183 is provided with a suitable connection to the cam shaft so that longitudinal movement of the rod carries the cam shaft therewith in a longitudinal direction. This rod is provided with a series of notches 183a which a spring pressed plunger 184 is adapted to engage to maintain the rod and cam shaft in set position. This construction is employed on both engines, and may be repeated of course for as many engines as are used if more than two are required. The cut-off mechanism including the rods 183 as shown, are operated simultaneously by a suitable system of levers 186 as illustrated somewhat schematically in Fig. 18. This system of levers extends to both ends of the car and has operating handles 187 and 188, one at each end of the car, and mounted adjacent to the throttle handles 167 and 168 so that the car is operated in all respects, the same from either end.

The exhaust steam from the engines is conveyed by suitable piping 189 to the condenser system indicated generally in Fig. 1, by the reference character 37. This condenser system is designed to condense any volume of steam delivered to it independent of weather conditions, and deliver the resulting condensate back to the generator. While the condenser is subject to many changes in construction, location and the like, within the scope of our invention, the particular system herein disclosed has been used with such great satisfaction and has been found so to assist the general operation of the car, that it will be described somewhat in detail.

Referring now to Figs. 5, 6, 7 and 15, wherein the condenser is detailed. The steam is delivered to the condensers by a pipe 191 which connects to a manifold 192, delivering the steam to headers 193 and 194 which extend the full length of the condenser, and are connected across the front of the condenser by a connecting header 196. The headers have connected thereto a plurality of radiators 197 and 198, with enlarged portions 199 and 201 at the lower ends of the condensers for controlling the condensate, suitable connections being made for delivering the entire body of condensate through a pipe 202, for further movement of the condensate as will be described hereinafter. The steam is condensed by radiation of heat from the radiator surfaces, and the radiation rate is increased or decreased in accordance with the amount of air passing across the radiators. In very cold weather and when the car is in motion, the ordinary movement of air incidental thereto may be found sufficient to effect satisfactory operation. However, since condenser action must go on independent of movement of the car or weather conditions, means is provided whereby a greater or less amount of air may be moved across the radiators as required.

As Fig. 5 shows, the condenser as a whole is divided into a number of sections of varying sizes, each equipped with fan mechanism so that by operating any one, or combination, or all of the fans, the radiating rate may be controlled within relatively large limits. The fan mechanism at each condenser section is substantially the same with the exception of the size of the fans. The drive is by means of an electric motor 203, with its shaft extending longitudinally of the car so as to permit extension by suitable joints to all of the fans, this shaft extension being operated at all times, but the fans being adapted to be connected or disconnected by a clutch mechanism as required.

As to the specific operation of the fans, this is shown in Fig. 15. The motor shaft extension 204 extends underneath the fans and has feathered thereto a clutch operating member 206 with an annular recess 207 which is engaged by an arm 208 of a bell crank lever 209. This lever has a long arm 211 engaged near its top by a plunger 212 connected with an air piston operating in a cylinder 214. Accordingly, the admission of air to cylinder 214 will force the bell crank around its pivot 216, thereby moving the arm 208 and the member 206 as well. Return of the bell crank is effected by a tension spring 217 connected as shown. Surrounding the shaft 204 but separated therefrom is a sleeve 218 suitably journaled and having integrally secured therein a bevel gear 219. This sleeve carries a plurality of discs 221 forming part of a multiple disc clutch, the remaining discs 222, being carried by the member 206. The bevel gear 219 engages a ring gear 223 also beveled, and this ring gear is constructed to carry an upright shaft 224 on which a fan 226 is mounted. Consequently, rotation of the ring gear and shaft 224 causes the fan 226 to operate, thereby drawing increased volumes of air across the radiating surfaces. The mechanism shown in Fig. 15 is repeated for each fan so that the clutch mechanisms may be selectively engaged or disengaged by operation of the air piston, thereby effecting changed radiating rates for the condenser as required by weather and other conditions. These fans may be cut in or out automatically as determined by the rate of flow and temperature of the condensate as it passes out of the condenser. However, we find that weather conditions will remain uniform for such substantial lengths of time that the condenser can be set as required and allowed to remain so during the ordinary run. There are safety and indicating features connected with the operation of the system as a whole, and the condenser system specifically, whereby the functions of the condenser may be understood readily by the operator. These will be referred to more fully hereinafter.

In the operation of the condenser, it is of course possible that due to the provision of insufficient radiation with a particular setting of the fans, uncondensed steam will reach the outlet 202. Unless some provision is made for preventing such a contingency there is a possibility of injury to the system as a whole, or at least, impaired operation. We employ, for protection against such a possibility, a thermostatically controlled trap of suitable type as shown in Fig. 7. The condensate passes through the opening 202a, and this opening is provided with a seat adapted to be engaged by a valve 227 for closing the passageway. A suitable expansion element 228 is connected with the valve 227 so that when a predetermined temperature is reached, say approximately one hundred ninety to two hundred degrees Fahrenheit, the valve will close due to the expansion of the element 228, and prevent further passage of condensate through the opening 202a. It is preferable, of course, that the water fed to the steam generator be as high in temperature as possible, but without tendency to generate steam, and the trap may be constructed to remain open until a temperature slightly less than two hundred twelve degrees is attained. We find however, that due to a certain lag in the operation of the element which is unavoidable, it is preferable to set the device to prevent flow of condensate above a temperature of approximately one hundred ninety degrees.

In order to avoid any possibility of building up a sufficiently high pressure in the condenser system to cause injury thereto, we insert in the steam line between the steam engine and the condenser a relief valve 220 (Fig. 18). This relief valve should be set at approximately six pounds.

From the trap, the condensed steam passes through a separator for removing any oil which may be present, and thence to a water reservoir which we term a "hot well", whence it is drawn by a water feed pump and delivered back to the generating coils. The separator 229 receives the condensate by means of the pipe 202, and separates the oil, delivering it through a pipe 231 to a suitable oil reservoir 232, forming a part of the lubricating system (not shown). The water is delivered through pipe 233 to an upright pipe 234 connected with the water reservoir or "hot well" 236. The water-oil separator of the type employed by us with good results is of the well known centrifugally operated disc type used extensively in the dairy art and similar arts. As far as we know, the separation of a small body of oil from a large quantity of water has not been satisfactorily accomplished by this means in the past, and the separator which we have used and modified in certain details and now performs this function with very great satisfaction.

The water is pumped from the hot well 236 by means of a specially designed pump having certain features of unusual value for this particular purpose. Since, however, this pump is subjected to continuous operation through its connection with an auxiliary pump system forming a part of the equipment, it is deemed advisable for a full understanding of the details of the pump, that the auxiliary equipment be described first.

Substantially all of the auxiliary equipment is operated by electrical means, and to supply the demand for current, an electrical generator 237 is provided, driven by an auxiliary steam engine 238, designed to employ steam directly from the main system. As shown schematically in Fig. 18, a steam line 239 feeds the auxiliary steam engine and the exhaust steam is discharged through an exhaust line 241 and connected to the condenser system. The shaft of auxiliary steam engine 238 extends beyond the engine at both ends thereof and one of such shafts is connected through a suitable system of gears 242 to drive the water pump. This pump includes a plurality of cylinders 243—243 in which pistons 244—244 are adapted to reciprocate. They are driven by suitable crank mechanism connected to the main pump shaft 246 (Fig. 12). Each of the cylinders is provided with a spring pressed discharge valve 247 and a spring pressed water intake valve 248. There are features in connection with the intake valves which will be described in connection with the function which they perform. The hot well or water reservoir 236 holds the entire supply of available water within the system for delivery to the steam generating coils. It is essential for the proper operation of the system that the pump deliver water, and accordingly, we provide means for rendering the pump ineffective in the event of failure of the water supply. In this connection a float 249 is provided in the hot well with a downwardly extending rod 251 extending through the water delivery line 234 and connected to a lever 252, forming part of an over-center switch. The lever 252 is bifurcated as shown in Fig. 14 and has secured at the central point thereof, a spring 253, shaft 254, on which the lever 252 is pivoted and is broken at this point to allow space for the operation of the spring. The opposite end of the spring is connected to an arbor 256 which is carried on shaft 254 so as to turn the same when moved by the force of the spring 253. Shaft 254 also carries a plurality of fingers 257, each of which is adapted to engage a rod 258 connected with the intake valve 248. Accordingly, it is seen from Fig. 13 that when shaft 254 is turned in a clockwise direction (looking at Fig. 13) the fingers 257 engage rod 258 and also valve 248. According to the operation of this device when the float is raised, with a full supply of water in the hot well, the over-center switch will have the position shown in dotted lines in Fig. 12. As the supply of water diminishes however, the float is lowered and lever 252 turns about its pivot in a counter-clockwise direction until the spring 253 is over the center of shaft 254, at which point the tension stored in the spring is effective to snap the arbor 256 around in a clockwise direction, thereby carrying with it shaft 254 and fingers 257. The result is to open the intake valves of the pump and then instead of pumping water through the delivery valves, the water swishes in and out through the intake valves. On replenishing the system, or providing additional water in the hot well in any way whatsoever, the over-center switch mechanism functions in a reverse direction, thereby turning the shaft 254 in a counter-clockwise direction and releasing the intake valves of the water pump so as to permit charging of the system.

We shall now refer to certain safety features which are of prime importance in a satisfactory, safe operation under all conditions of the car of our invention. As shown in Fig. 18, a thermocouple 261 is provided adjacent the pilot light and forms part of an electrical circuit, including conductors 262 and 263 leading to an electromagnet 264. This magnet has a plunger type of armature 266 adapted to connect or disconnect a pair of contacts 267 and 268. The contact 268 is connected by means of a conductor 269 to the electro-magnet 103 which controls the operation of the burner. The terminal of electro-magnet 103 is connected by a conductor 271 to contact 94 (Fig. 16) of the steam pressure control switch. Contact 93 of the same switch is connected by a conductor 272 to one of the main lines 273 leading from the generator 237. Returning to contact 267 which is adapted to be closed by armature 266 (Fig. 18), this is connected by a conductor 274 to still another safety system which will now be described.

Within the drum 48 is a mercury bulb 276 with a relatively small pipe line 277 leading to a coil type expansion element 278, one end of which is connected to a bell crank lever 279. This lever is pivoted at 281 and has a normal pull by means of a spring 282 in a direction to close contacts 283 and 284, the contact 283 being carried on the pivot 281 and moving with bell crank 279. Excessive temperature within the drum 48 therefore, will serve to expand the mercury or other fluid within the system, including the bulb 276, line 277 and element 278, and open contacts 283 and 284. Conductor 274 is connected through a suitable portion of the mechanism with contact 283, and contact 284 is connected by a conductor 286 with one of the main lines 287 from the generator.

As a result of this system, should the pilot light by any chance, become extinguished, the supply of current to the electro-magnet 103 will fail and the main burner nozzles and air supply can not be turned on at such a time. Through failure of water or for any other reason, if a dangerously high temperature exists in the drum 48, the supply of current to the electro-magnet 103 will also be cut off and the main burner will be extinguished. As previously described in connection with the steam pressure, the main burner is also extinguished when a predetermined or maximum of steam pressure is attained.

In connection with the drum 48 and the amount of water therein, separate indicating means is provided of a type which shows a warning signal when the water level is too low. This is designed to reveal the water system condition to the operator so that it can be corrected and additional water supplied to the system before the heat in the drum or other condition causes an extinguishment of the main burner. In this connection a mercury bulb 288 is mounted in a casing 289 adjacent the drum and the casing has connected therewith pipes 291 and 292 leading to the upper and lower portions of the drum respectively. Bulb 288 is connected to a gauge 293.

Now as Fig. 18 shows the feed water at lower temperature is also passed through the casing 289 by means of the delivery line 294 from the water pump. This water has a tendency to keep the bulb cool, and will be effectual for this purpose as long as the bulb 288 is covered with drum water. When the water is lowered, however, and steam is in contact with the bulb, more heat is supplied thereto than can be withdrawn by the feed water, and its temperature is raised. This expands the bulb fluid and registers, as low water on the gauge. This arrangement not only shows low water, but will register if the feed water supply is low. We also employ a check valve 298' in the pipe line 294, to prevent pressure generated in the preheater coils from forcing water back into the pump when it is not operating.

It is obvious that when the steam generator is operating, the auxiliary engine drives the generator, and by means of the steam and electrical power at the disposal of the system, the unit is operative. However, when the system is cold, electrification is required for various purposes, principally starting, and we employ a small generating unit for starting and other problems. Looking at Fig. 1, a small internal combustion engine 297 is mounted in a suitable position, preferably under the car, and is adapted to drive an electric generator 298, producing current at proper voltage, and in sufficient amount for starting and incidental requirements. It will be recalled that in starting the system the pilot light is preliminarily aided by means of the resistance 84. Current is supplied to this resistance by suitable conductors from the generators 298 and where lights are required, the lights also are supplied with power from the same source. We provide means (not shown) in the present application for automatic shifting over to the main system when sufficient steam has been generated to drive the auxiliary equipment and the motor generator 237.

As to the air required for operating the condenser fan clutches, the usual braking requirements and the like, we provide any suitable type of air compressor 299 (Fig. 1). Since the features of this equipment are well understood in the art, no complete showing is made thereof.

By consulting Fig. 4, it will be seen that the auxiliary engine and generator with the water pump, separator and other equipment are mounted in a group at one side of a compartment 301, occupying substantially the amount of space in the car as now is generally given over to a standard platform.

The compartment 301 can be reached from the main body of the car by a door 302, and an end door at 303 is also adapted to be opened so that the passageway is closed in the usual manner at the ends of the car. However, it will be stated that generally it is preferable to operate the car with the compartment 301 at the front and avoid ordinary passage through this compartment 301. While this compartment may be used if required it will be found better under most circumstances to exclude passages therefrom. Furthermore, there is some advantage in the operator being closer to the equipment, although as far as driving the car, this is accomplished with full satisfaction from either end. The system operates with such satisfaction and so effectively automatically, that apart from making certain adjustments and the like when starting out it is very seldom necessary for an operator to give any attention whatsoever to the steam system.

It may be supposed that the action of a high pressure steam generator system with a burner operating at high temperature would cause objectionable heating of the car as a whole. We find that on account of certain precautions and features which we have employed that the reverse is true, and the car equipped in accordance with our invention is as satisfactorily ventilated and kept at substantially as even a temperature as the ordinary coach.

Looking at Fig. 4, it will be seen that a thin partition 304 surrounds the generator and drum, with a second cross-partition 306 between the drum and generator. The blower draws air from the drum compartment through an air duct 307 located near the bottom of the compartment. The passageway between the drum compartment and generator compartment is open at the top, while the main partition around the generator is open at the bottom at 308. Accordingly, as the air is drawn into the blower 66, it passes through the opening 308, up around the steam generator casing, over the top of the partition 306, and down past the drum, and thence through the air passageway or conduit 307. The air, therefore, moves past the heated surfaces in the generator and drum, thereby cooling the compartments in which they are located, and when finally delivered to the blower, is at a fairly high temperature, thus aiding greatly in the efficient operation of the burner. This air is drawn first from the compartment 301, and tends to move the entire body of air in the car toward the compartment 301 and thence into the blower. This air will leak through the car through small cracks around doors and windows and the like, or through small ventilators if they are open, so that a continuous supply of fresh air is available inside the coach at all times. Since the movement is towards the warm end of the car there is no possibility of obtaining any undesirable result from the location of the steam generating equipment within the car body. Rather, an advantage is obtained, and of course, there is the concomitant advantage of supplying highly heated air by this means, to the burner.

Attention is called to the fact that there are no joints in any of the steam or water coils located near the burner flame, or outside the casing 41. This is a safety precaution limiting the possibility of failure of the system. Moreover, due to the fact that at no place in the system is there a large volume of steam at any one time, it is impossible for any failures in the system to cause sufficient violent explosion of steam as to endanger either passengers or baggage. The only water charged portions of the system in contact with the burner flame are the tubes, and a failure here will result only in a gradual loss of pressure.

We have found that due to the rapid circulation of water in the system, and the fact that the water used continuously re-circulates with very little added water necessary, there is no tendency of the coils or any parts of the equipment to scale. After being in service for a considerable length of time they are found to be as bright and scaleless as when first installed. Consequently the life of the equipment should be at least as great as the expected life of the passenger coach. However, we advise an overhauling principally of the burner portions of the device, at approximately yearly intervals. By examining Fig. 8 it will be seen that the equipment is readily removed as a unit, and this can be accomplished by removing the door 309, disconnecting the coils, etc., and simply sliding the entire unit out of the side of the car. A replacement unit which is available for the purpose is then quickly installed, and the car is again ready for operation. We have found from experience that a day's time at the very most is required to make a change of this kind. This feature is of very great value from the standpoint of maintenance, as it is known that locomotives are generally found to require overhauling, repair and the like which must be done in the shop, approximately 25% of the time. The advantage of our car over the locomotive in this respect is therefore, obvious.

Changing of the engines is accomplished much more readily than change in the generating equipment. Since the type of engine employed is a uni-flow type, with no necessary packing of the valves and the like, the engines are capable of long continued operation without attention. However, when it is necessary to make a change all that is required is to disconnect the drive shaft, the steam inlet line and exhaust line and then drop the engine by disconnecting its supports, and in a very short time replacing it with a new engine so that the car can continue in service without the loss of time.

The cut-off element of the engines is such that the same driving effort and the like is possible in either direction. In addition the cut-off can be placed in a neutral position so that only the piston assembly will be moved. However, it may be desirable to draw the car as a trailer. We accordingly place a clutch 311 at a suitable place in the drive shaft so that the shaft can turn idle without turning the engines when the car is drawn as a trailer.

As Fig. 4 shows, all of the operating mechanism is within easy reach of the operator's seat 312, the arrangement of the throttle and cut-off levers being in general substantially the same as in an ordinary steam locomotive. An air brake operating handle 313 is also provided at a suitable position for operating the usual air brakes (not shown) and provision is made for the operation of hand brakes by a hand wheel 314. In connection with the starting of the system it is necessary that certain acts be performed in a required sequence, otherwise difficulties may be encountered.

There are additional advantages in the performance and operation of the locomotor, many of which will be understandable to those skilled in the art. From the standpoint of economy for example, in a car of the present type which we have used in actual operation, a fuel consumption of one gallon of distillate was required for each one and one-half running miles, or over one hundred ton miles of operation. This represents substantially the entire cost of operation, as all of the power is derived directly or indirectly from the burning of distillate. Due to the separation of lubricating oil from the steam, there is an additional saving of lubricant, with the consequence that lubricating costs are substantially negligible. The separating of the lubricant from the water of the system, is, of course, primarily for the purpose of preventing fouling of the generator coils, but the concomitant saving in lubricant is of considerable value over a long period.

As to the cost of maintaining the unit at a layover, there is none, as the equipment is entirely shut down and the burner and pilot light extinguished. Starting with an absolutely cold system, full operating pressure can be developed in from fifteen to eighteen minutes, depending upon the weather conditions. After the main burner has been lighted only two or three minutes are required, so that if only a short lay-over has taken place, say, in the neighborhood of an hour or thereabouts, the system will be sufficiently warm so that the main burner can be lighted almost at once. After three or four hours standing, full operating pressure can be developed in approximately five minutes, this also depending upon the weather. The advantage of the present invention as respects this feature is therefore, unquestioned.

In the operation of the water level indicator, this is a monitor which gives warning some considerable time before the danger point occasioned by low water is reached. It is a monitor of the proper performance for this type of terminal service, as in the ordinary operation of the car, distances of fifty to one-hundred miles can be covered without the loss of sufficient water to affect the operation of the system in any way, and it will not be necessary for the operator to give any attention to this point. Before the level where the indicator signals water depletion, there is ample water for a continued operation for a considerable period, but should this signal be allowed to pass for an unreasonable period without replenishing the system, additional losses will result in overheating of the drum and automatically shutting off the main burner until the water supply has been properly adjusted. This is a protection against the possibility of scorching the tubes. In addition to the signalling of water depletion it will be appreciated from the construction of the water level indicator that it will likewise detect leaks, circulation interference, pumping interruptions and failure of any part of the system to operate satisfactorily.

The accompanying drawings show the use of two engines connected to the axles for driving the same. The two engines operate fully individually however, there being no operating connection whatsoever except through the car wheels and rails. They are supplied with steam from a single throttle valve, but this has no effect in forming any mechanical connection. Consequently, the engines automatically compensate for changed positions of the wheels, slight differences in diameter, and the like. It is obvious that these same features can be maintained in using a larger number of engines, or they can be modified in various ways. Obviously a single engine can also be used, but we have found that we obtained more satisfactory results from a double engine drive in the manner set forth.

As the drawings show, and as has been described, very little floor area is given over to the steam generating system, thus enabling us to house the unit in a standard type of passenger coach in the manner set forth. We believe that this arrangement is possible largely due to the use of a very efficient type of burner, the burner being of a type known generally as a "blue flame" oil burner. The use of a forced air draught, and oil spray, coupled particularly with the use of a hot surface which aids in the final full vaporization of the previously atomized fuel, causes a quick combustion in the form of an intense blue flame, extending less than an inch beyond the burner rings. This permits the coils to be grouped very closely about the burner without danger of scorching. This makes possible the construction of a compact, small burner, capable of use in a car of this character, where other systems of combustion could not be developed for satisfactory use within a small area. In addition to the compactness of the steam generating unit, which is a big advantage in itself, the blue flame burner produces a very low percentage of radiant heat, and in a relatively small unit the advantages of this feature are readily understandable to those skilled in the art.

The boiler is constructed without any heat insulating means which would absorb heat and give this heat back to the system after the burner is extinguished. It is readily understood that if a burner were shut off when a pressure of six hundred pounds, for example, were attained, and no steam was being used, the presence of parts within the burner which had absorbed a large amount of radiant heat might build the pressure up to seven hundred pounds or even more, even though the system was not designed for such pressures. With our blue flame burner designed so that all of the heat is immediately available to the coils, and not stored up in fire brick and the like, when the burner is shut off due to increased pressure, there is nothing which will build the pressure up above six hundred pounds, and accurate operation is possible.

As has been previously explained, the car is adapted for one man operation under all circumstances. The loss of water from the system is so slight that in ordinary runs on which the car will be used, it is not necessary to replace water. However, circumstances may arise where the car is used for relatively long periods of time, and it will then be necessary, or at least advisable, for the operator to replenish the system. We provide means whereby this may be accomplished from the driver's seat, and from either end of the car, the system employed being shown schematically in Fig. 19.

The drawing shows the hot well and water pump as illustrated in the previously considered figures, together with the means for introducing a new supply of water. This is gravity fed from a water tank 321, to the hot well 236, a valve indicated generally by the reference character 322 being provided for controlling the flow of water. This valve is operated by air supplied from a tank 323 connected with the air compressor 299. Air lines 324 and 326 from opposite ends of the car lead to the water control valve, and air valves 327 and 328 immediately adjacent the operator's seats supply air under pressure to these lines from supplying air lines 329 connected with the air tank.

As to the details of the water control valve, these may vary without departing from the scope of our invention; but Fig. 20 illustrates a type of valve which we have employed with very great satisfaction. In this valve a bi-part casing 331 supports a diaphragm 332, the diaphragm 332 having connected to a mid-point thereof a valve plunger 333. This valve plunger extends through a circular projection 334 on the casing, and a valve housing is axially secured to said circular projection 334 and is provided with a valve seat 337, which a valve head 338 carried by the valve plunger 333, engages. The valve housing has connected thereto a water inlet pipe 339 and a water outlet pipe 341, flow of water through the valve housing from the inlet to the outlet pipes being controlled by movement of the valve head 338. A compression spring 342 surrounds the valve plunger 333 within the circular casing projection 334, and tends to force the diaphragm assembly, including the valve plunger, in a direction to close the valve. However, at the opposite side of the diaphragm, an air pipe 343 communicating with both the pipes 324 and 326, is screw threaded into a boss 344 forming a communication with the inside of the casing. Consequently admission of air under pressure to either pipe, 324 or 326, will be effective in expanding the diaphragm against the pressure of spring 342 to open the water valve. Release of this pressure will permit return of the valve by means of the spring 342 and so arrest further flow of water past the valve. By this means the amount of water introduced into the system can be definitely controlled.

As to the valves 327 and 328, these are not shown in detail since they are the ordinary standard type of three-way air valve, wherein movement in one direction will build up pressure in a line, a neutral position will retain the pressure, and movement in the opposite direction will serve to release the pressure. It may be stated in further explanation, that this is the same type of valve as used for air brake control and the like.

In order to acquaint the operator with the condition of the system, a water indicator gauge is provided at each end of the car. These devices are indicated by the character 293 and consist simply in duplications of the gauges 293 (Fig. 18), and are operated as illustrated and previously described. The gauge is at all times, within the operator's view and so it will be seen that except in a possible case of emergency it will never be necessary for the operator to leave his seat to care for the system.

We claim:

1. In a self propelled railway car, a wheeled body, a steam generator including a fuel oil burner and circulating coils, a separating and storage drum connected to the coils, an engine having a drive shaft direct connected for driving the car, a steam connection from the top of the drum to the engine, a condenser carried by the body, an exhaust steam connection from the engine to the condenser, a connection for delivering condensate water from the condenser, a hot well for storage of the condensate delivered from the condenser, a water pump having intake and outlet valves adapted to draw water from the hot well and force the same under pressure into the circulating coils, and means operating to hold the valves open for rendering the pump ineffective when the water level in the hot well decreases to a predetermined level, and operating to permit normal action of said valves for again rendering the pump effective when the water level in the hot well is raised.

2. The combination set forth in claim 1, including means for automatically extinguishing the main burner when a predetermined maximum steam pressure is attained.

3. The combination set forth in claim 1, including means for automatically extinguishing the main burner when a predetermined maximum steam pressure is attained and re-igniting such burner when the steam pressure is decreased a predetermined amount.

4. In a self propelled railway coach, a wheeled vehicle, a multicylinder steam engine for driving the same, a steam generator, a steam connection from the generator to the engine, a steam condenser, a storage tank for condensed steam in the form of water, a centrifugal separator for removing lubricant from such water, and a water pump for returning the water from the storage tank to the steam generator.

5. In a self propelled railway body, a wheeled vehicle, a multicylinder steam engine for driving the same, a steam generator, a steam connection from the generator to the engine, a variable capacity steam condenser, a storage tank for condensed steam in the form of water, a centrifugal separator for removing lubricant from such water, and a water pump for returning the water from the storage tank to the steam generator.

6. In a self propelled railway body, a wheeled vehicle, a multicylinder steam engine for driving the same, a steam generator, a steam connection from the generator to the engine, a steam condenser, a storage tank for condensed steam in the form of water, a separator for removing lubricant from such water, and a water pump for returning the water from the storage tank to the steam generator, said water pump being operated continuously, and including inlet and delivery valves, and means for holding the delivery valves open when the water level in the water storage tank is low so that passage of water through the delivery valves is prevented.

7. The combination of claim 6 wherein said valve holding means includes a float in the storage tank engaging fingers for contacting with the inlet valves and mechanical connections from the float to said fingers for moving the same against the valves to open the same when the float moves downwardly to a predetermined point.

8. In a self propelled railway coach, a wheeled vehicle, a multicylinder steam engine for driving the same, a steam generator, a steam connection from the generator to the engine, a steam condenser, a storage tank for condensed steam in the form of water, a centrifugal separator for removing lubricant from such water, and a water pump for returning the water from the storage tank to the steam generator, said steam generator including a burner, water and steam circulating coils disposed about said burner, a steam and water separating and steam storage drum, and means for extinguishing said burner when the temperature of the steam in said drum is raised to a predetermined point.

9. In a self propelled railway car, a wheeled vehicle, a multicylinder steam engine for driving the same, a steam generator, a steam connection from the generator to the engine, a steam condenser, a storage tank for condensed steam in the form of water, a centrifugal separator for removing lubricant from such water, and a water pump for returning the water from the storage tank to the steam generator, said steam generator including a burner supplied with fuel oil and oil under pressure and at high velocity, water and steam circulating coils disposed about the burner, a steam and water separating and steam storage drum connected to the coils, and means for shutting off the flow of oil and air to extinguish the burner when the temperature of the steam in the drum is raised to a predetermined point.

10. In a self propelled steam railway car, a closed steam system including a steam generator, engine and steam condenser in which feed water is continuously re-circulated, a reserve water supply tank, and distantly operated means for introducing water from said tank into the system to compensate for water losses during operation.

11. In a steam propelled railway car, a standard type of car a relatively small compartment therein, a high pressure re-circulating type of steam generator in said compartment, a multicylinder uniflow engine under the car for driving the same, and a steam condenser disposed near the roof of the car, the steam connections being from said generator to the engine, to the condenser and back to the generator thus constituting a closed steam system, and a thermostatically controlled trap disposed in the system between the condenser and steam generator, whereby steam is prevented from being fed to said generator, a pump for forcing condensate from the condenser to the generator, and means for preventing pumping operation when the condensate supplied thereto is less than a predetermined amount.

12. In a steam propelled railway car a closed steam system including a steam generator, engine and condenser, a storage well for receiving condensate in the form of water from the condenser, a pump having intake and outlet valves for drawing condensate from said well and forcing the same under pressure into the generator and means rendering the valves inoperative for preventing pumping action when the level of water in said well decreases to a predetermined amount.

13. In a steam propelled railway car, a closed steam system including a steam generator, engine and condenser, a water storage tank and a water oil separator disposed between the condenser and water storage tank for removing from the condensate whatever lubricant has been carried by the steam from the engines, whereby scaling of the steam generator by said lubricant is avoided.

14. In a self propelled railway car a wheeled body, a multicylinder steam engine for driving the same, and a steam generator including a central burner, circulating coils surrounding the burner, a steam and water separating and storage drum and a steam gauge including a thermostatic element outside the drum, connections running from the top and bottom of the drum for steam and water respectively and communicating with the element, and visual means for showing the effect of the steam and water on the element whereby the steam level is indicated.

15. In a self propelled railway car, a wheeled body, a multicylinder steam engine for driving the same, and a steam generator including a central burner, circulating coils surrounding the burner, a steam and water separating and storage drum, a condenser for reducing the exhaust steam from the engines back to water, a pump for forcing said water through a supply pipe back into said coils, and a steam gauge including a thermostatic element outside the drum, connections running from the top and bottom of the drum for steam and water respectively and communicating with the element, and visual means for showing the effect of the steam and water on the element whereby the steam level is indicated, said water pumped into said coils passing through a casing housing said thermostatic element.

16. In a self propelled railway car, a wheeled vehicle, a multicylinder steam engine for driving the same, a steam generator, a steam connection from the generator to the engine, a steam condenser, a storage tank for condensed steam in the form of water, a separator for removing lubricant from such water, and a water pump for returning the water from the storage tank to the steam generator, said condenser including a plurality of heat radiating sections, means for passing exhaust steam through all of said sections, a separate air fan disposed at each section, and means for operating any one or all of said fans independent of the speed of the vehicle whereby the condenser capacity is modified.

17. In a steam propelled railway car, a wheeled body, a steam engine supported under the body and mounted to drive the wheels, a steam generator carried by the car including a fuel oil burner, a steam connection from the generator to the engine, a steam condenser of variable condensing capacity, connections from the condenser to pass condensate water back to the generator, electrical means for controlling the operation of the generator and burner, a continuously driven auxiliary steam engine exhausting into said condenser and an electric generator driven thereby and adapted to supply power for said electrical controlling means.

18. In a steam propelled railway car, a wheeled body, a steam engine supported under the body and connected to drive the wheels, a steam generator carried by the car including a fuel oil burner, a steam connection from the generator to the engine, a steam condenser of variable condensing capacity, connections from the condenser to pass condensate water back to the generator, a pump for forcing said water condensate under pressure back into the generator, electrical means for controlling the operation of the generator and burner, a continuously operated auxiliary steam engine exhausting into said condenser, an electric generator driven by said auxiliary engine and furnishing power to said electrical controlling means, and a direct mechanical connection between the auxiliary engine and water pump for continuously operating said pump during the operation of said engine.

19. In a steam propelled railway car, a wheeled body, a steam engine supported under the body and connected to drive the wheels, a steam generator carried by the car including a fuel oil burner, a steam connection from the generator to the engine, a steam condenser of variable condensing capacity, connections from the condenser to pass condensate water back to the generator, a pump for forcing said water condensate under pressure back into the generator, electrical means for controlling the operation of the generator and burner, a continuously operated auxiliary steam engine exhausting into said condenser, an electric generator driven by said auxiliary engine and furnishing power to said electrical controlling means, a direct mechanical connection between the auxiliary engine and water pump for continuously operating said pump during the operation of said engine, and means responsive to decreased water supply to said pump for preventing pumping action by said pump while still mechanically connected to said generator.

20. In a steam propelled railway car, a wheeled body, a steam engine supported under the body and connected to drive the wheels, a steam generator carried by the car including a fuel oil burner, a steam connection from the generator to the engine, a steam condenser of variable condensing capacity, connections from the condenser to pass condensate water back to the generator, a pump for forcing said water condensate under pressure back into the generator, electrical means for controlling the operation of the generator and burner, a continuously operated auxiliary steam engine exhausting into said condenser, an electric generator driven by said auxiliary engine and furnishing power to said electrical controlling means, and a direct mechanical connection between the auxiliary engine and water pump for continuously operating said pump during the operation of said engine, said generator and burner being grouped as a unit at one side of a small compartment at one end of the car, and said auxiliary engine, generator and water pump grouped as a single unit at another portion of the compartment, leaving aisle space therebetween for the purpose described.

21. In a steam propelled rail car, a wheeled body, a wheel driving engine secured thereto, a steam generator including a fuel oil burner, a variable capacity steam condenser, auxiliary equipment including a fuel pump, air blower, water and oil separator and water pump, a continuously running auxiliary steam engine, and an electric generator driven thereby, all of said auxiliary equipment and variable capacity steam condenser being driven by said engine and generator, in the manner and for the purposes set forth.

22. In a self propelled steam railway car, a steam system including a generator having a main burner and a pilot light burner, electrical means for preliminarily heating the pilot light burner, and an auxiliary electrical generating unit for supplying electric current to said heating means when the steam system is cold.

23. In a self propelled steam railway car, a steam system including a generator having a main burner and pilot light burner, electrical means for controlling and operating the system, an auxiliary steam engine, a motor generator driven thereby to supply electricity when said steam system is in operation, and a separate electrical generating unit for supplying power before the steam pressure has been raised sufficiently to operate the main electric generator.

24. In a self propelled steam railway car, a closed steam system including a steam generator, engine, and steam condenser in which feed water is continuously re-circulated, a reserve water supply tank, a pipe connection from said reserve tank to said system, a valve disposed in said pipe connection, and means operable by compressed air for opening said valve to admit water from said tank to the system.

25. In a self propelled railway car, a steam generator, a car driving engine, a steam condenser, and connections between said generator, engine and steam condenser forming a closed system having a high pressure side between the steam generator and engine, and a low pressure side between the engine and generator including the steam condenser, a reserve water supply tank and remote control means for introducing water from said reserve tank to the low pressure side of the system.

26. In a self propelled steam railway car, a steam generator, an engine, a steam condenser, a hot well for receiving water condensate from the condenser, a pump for drawing water from said hot well and delivering the same to said generator, and remote control means for supplying water to the hot well for replenishing the system.

27. In a self propelled steam railway car, a steam generator, an engine, a steam condenser, a hot well for receiving water condensate from the condenser, a pump for drawing water from said hot well and delivering the same to said generator, thus forming a closed steam system in which feed water is continuously re-circulated, a reserve water supply tank, and distantly controlled means for passing water from said tank to the hot well of the system to compensate for water lost through long continued operation.

GUSTAF W. ENGSTROM.
CLYDE B. FAVERTY.
EARL C. WALKER.